United States Patent [19]

Simon et al.

[11] 3,787,964

[45] Jan. 29, 1974

[54] METHOD FOR MANUFACTURING A MAGNETIC HEAD

[75] Inventors: Paul Simon, Palo Alto; Robert E. Jones, Jr., San Jose, both of Calif.

[73] Assignee: International Business Machines Corporation, Armonk, N.Y.

[22] Filed: Dec. 23, 1971

[21] Appl. No.: 211,554

[52] U.S. Cl. .............. 29/603, 29/593, 179/100.2 C, 324/34 R

[51] Int. Cl. .............................................. G11b 5/42

[58] Field of Search ........ 29/603, 593; 179/100.2 L; 340/174.1 F; 346/74 MC; 324/34 R

[56] References Cited

UNITED STATES PATENTS

| | | | |
|---|---|---|---|
| 3,685,144 | 8/1972 | Trimble | 29/603 |
| 3,187,411 | 6/1965 | Duinker et al. | 29/603 |
| 3,249,987 | 5/1966 | Duinker | 29/603 |
| 3,344,237 | 9/1967 | Gregg | 179/100.2 C |
| 3,400,386 | 9/1968 | Sinnott | 29/603 |
| 3,564,522 | 10/1971 | Stevens, Jr. | 29/603 X |
| 3,706,926 | 12/1972 | Barrager et al. | 324/34 R |

*Primary Examiner*—Charles W. Lanham
*Assistant Examiner*—Carl E. Hall
*Attorney, Agent, or Firm*—Robert W. Keller et al.

[57] ABSTRACT

This disclosure relates to a method for manufacturing a magnetic head. The steps of the method comprise forming a transformer having a first magnetic layer, a primary winding, a secondary winding separated from the primary winding, the primary and secondary windings being disposed on the first magnetic layer, and a second magnetic layer disposed over the primary and secondary windings. The first and second magnetic layers encircle portions of the primary and secondary windings thus forming a continuous magnetic path. Tests determinative of its magnetic properties are made on the transformer. Thereafter, the transformer is severed between the primary and the secondary windings and the secondary is discarded. The primary is then lapped to form a thin-film magnetic head.

10 Claims, 1 Drawing Figure

PATENTED JAN 29 1974 3,787,964
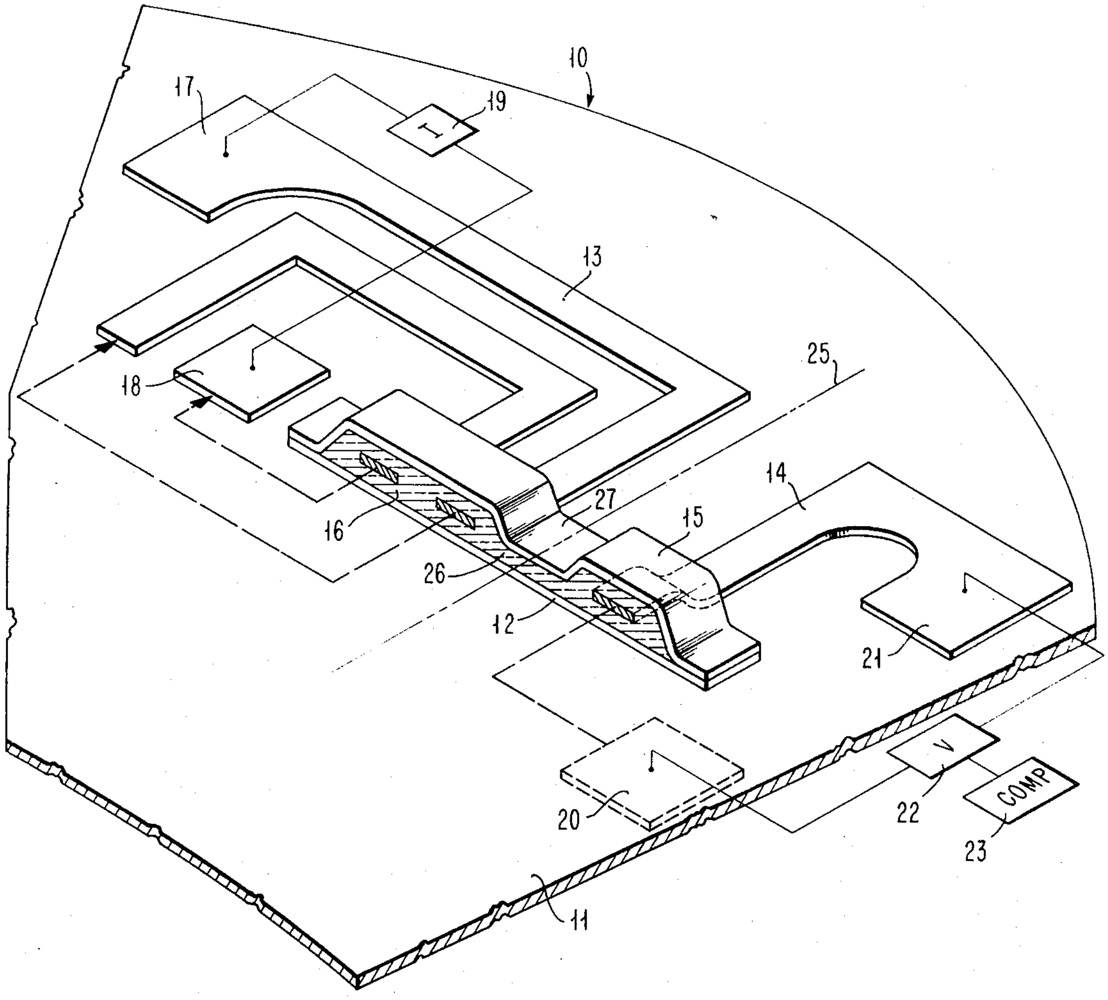

METHOD FOR MANUFACTURING A MAGNETIC HEAD

CROSS REFERENCES

U. S. Pat. No. 3,706,926, "Method and apparatus for Testing Batch Fabricated Magnetic Heads During Manufacture Utilizing Magnetic Fields Generated By Other Magnetic Heads," by S. M. Barrager, G. Bate, and S. H. Smith.

BACKGROUND OF THE INVENTION

1. Field of the Invention

This invention relates to manufacturing a thin-film magnetic head and, more particularly, to a method of manufacturing a thin-film magnetic head by first forming a thin-film transformer having a continuous magnetic path and then severing the transformer between its primary and its secondary windings.

2. Description of the Prior Art

The use of magnetic heads to record and reproduce information has become quite important in recent years. Many high speed digital computers require high speed transfer of information utilizing magnetic heads which are disposed in transducing relationship to a moveable magnetic medium such as a magnetic disk, magnetic tape or magnetic cylinder. An example of a magnetic head manufactured by known thin-film techniques is found in U. S. Pat. No. 3,344,237, D. P. Gregg, Deposited Film Transducing Apparatus and Method of Producing the Apparatus, issued Sept. 26, 1967. This patent teaches a thin-film magnetic head formed by depositing the appropriate magnetic, conductive and insulating layers onto a non-magnetic substrate. A second non-magnetic substrate is placed around the magnetic head and against the non-magnetic substrate to form an air-bearing slider which allows the magnetic head to fly over the surface of the magnetic medium. Air-bearing magnetic heads prevent associated wear problems caused by frictional contact between the transducer and the recording medium.

Up to the present time, there is no known method of insuring that a completed magnetic head will be defect-free and have acceptable magnetic properties. It is possible that the materials used in fabricating the magnetic head are non-uniform in composition, or not in compliance with specifications, resulting in unacceptable magnetic heads. Furthermore, unacceptable magnetic heads may result from slightly varying a critical parameter during the manufacturing process, such as temperature or pressure or by depositing a thin-film having discontinuities therein.

Generally, thin-film recording heads are fabricated in batches on the surface of flat substrates of glass, ferrite or silicon. Each head in the batch should have its magnetic properties tested to assure that it meets production specifications. The primary technique of testing the magnetic properties of these heads is to mount each completely-fabricated head in a slider or similar device and energize the head to perform actual dynamic record and reproduce operations on a moving magnetic medium. This technique requires engineering time and effort and thus is relatively expensive to implement.

Another technique is to fabricate a separate conductor on the substrate next to the gap region of each head. This is extremely difficult to do in practice since the air space between the test conductor and the gap results in low coupling efficiency. Another problem with this technique is that the coupling efficiency between the gap and the conductor must be known in order to determine properties other than frequency response. It is our invention to construct a transformer and to fabricate a magnetic head from the transformer. This permits functional magnetic testing of each thin-film head while the head is on the substrate, before the substrate is diced into separate head elements. Thus, this invention eliminates the expensive requirement of magnetically testing a completed transducer assembly.

An object of this invention is to provide a method of manufacturing a magnetic head comprising the steps of forming a transformer with the magnetic layers of the transformer forming a continuous magnetic path and encircling portions of the primary and the secondary conductive windings associated with the transformer, and severing the transformer between the primary and the secondary windings.

Still another object of this invention is to manufacture a magnetic head as set forth above by forming a transformer having a first magnetic layer, a primary conductive winding, a secondary conductive winding separated from the primary winding, the primary and the secondary windings disposed on the first magnetic layer, and a second magnetic layer disposed over the primary and the secondary windings.

In accordance with the preceding object it is another object of the invention to provide a magnetic head as set forth above wherein the transformer is formed by thin-film techniques such as electroplating and vacuum deposition and wherein the magnetic layers and the layers of the conductive windings are substantially parallel to one another.

Still another object in connection with the foregoing objects is to provide a method of manufacturing a magnetic head which includes the additional steps of magnetically testing the transformer by energizing one of the conductive windings with an electrical current, measuring the electromagnetically induced voltage across the other of the windings, and comparing the voltage with a predetermined reference of acceptability.

Still another object in connection with the foregoing objects is to include the steps of selectively depositing insulating layers so as to electrically isolate the conductive windings from the first and the second magnetic layers.

It is still another object to lap the severed assembly to accurately define a transducing gap.

Further objects of the invention pertain to the particular features of the steps in manufacturing the magnetic head assembly whereby the above-outlined and additional operating features thereof are obtained.

The invention both as to its organization and method of operation, together with further objects and advantages thereof will best be understood with reference to the following specifications taken in connection with the accompanying drawing.

BRIEF DESCRIPTION OF THE DRAWING

FIG. 1 is a portion of a sectional perspective view of the magnetic head assembly.

SUMMARY OF THE INVENTION

Referring to FIG. 1 of the drawings, a magnetic head assembly generally illustrated as 10 is shown. The single magnetic head comprises a non-magnetic substrate 11 which serves as a backing member. The substrate may be formed from a suitable insulating material such as oxidized silicon, aluminum oxide, or barium titanate, and has a planar top surface.

Onto the top surface is deposited a first magnetic layer 12 of a paramagnetic material such as Permalloy or ferrite. As shown, the first magnetic layer 12 is formed into the shape of a substantially thin rectangular parallelepiped. The thickness of the layer may be one to two microns thick. Patterns may be formed in the deposited films using known photolithographic techniques such as masking and etching. Alternatively, electroforming techniques can be utilized.

An insulation layer 16 is then selectively formed over the magnetic layer 12. The insulation layer is necessary to prevent shorting of the individual primary turns and to isolate them from the secondary, as is hereafter described.

A primary conductive winding 13 is then deposited onto a substrate in a shape that resembles a spiral. The primary conductive winding illustrated in the drawing comprises two turns although magnetic heads having many turns and several layers have also been fabricated. The number of turns or the number of layers of the primary conductive windings does not comprise the substance of this invention. The winding 13 terminates in conductive terminal pads 17 and 18.

A secondary conductive winding 14, coplanar with the first conductive winding 13 is deposited on the substrate 11. The single turn winding terminates in pads 20 and 21 and the turn is deposited such that it is substantially parallel to the adjacent edge of the closest turn of the primary winding 13. The dashed lines in FIG. 1 indicate the paths of conductive windings 13 and 14 as they would appear in a complete perspective view. This winding 14 may be formed in the same steps which form the primary winding 13. A second insulation layer serving substantially the same function as the first insulation layer may then be required.

A second magnetic layer 15 is then deposited over the top surfaces of portions of the primary and the secondary conductive windings and against and in contact with the end portions of the first magnetic layer. The second magnetic layer appears in plan view to extend substantially over the first magnetic layer, and the depositions of the magnetic layers and the conductive windings are substantially in planes that are parallel to one another and to the surface of the substrate 11. As fabricated, the first and the second magnetic layers form a continuous magnetic body. This body is linked around one side by the primary conductive winding and around the other side by the secondary conductive winding so as to create a transformer.

In the preferred embodiment illustrated in the drawing of this specification, the magnetic material used in the magnetic layers is a nickel iron alloy known as Permalloy which is electrically conductive. Thus, the insulating layers 16 previously described are required to electrically isolate the conductors 13 and 14 from the magnetic layers 12 and 15. The insulating layers 16 are preferably a glass material but may be made from any acceptable organic or inorganic material.

A current source 19 is connected between terminal pads 17 and 18 of the primary winding of the transformer and a voltmeter 22 is connected across the terminal pads 20 and 21 of the secondary winding. A comparator 23 is connected to the voltmeter 22 for comparing the output signal from the voltmeter with a calibration mark indicative of a magnetic head having acceptable magnetic properties. Alternatively, a reference signal indicative of the minimum voltage that a magnetic head with acceptable magnetic properties must have to meet specifications is applied to the comparator. Thus, the resultant output signal of the comparator will indicate whether the heads are acceptable or not. The current source could be applied to energize the secondary winding 14. Then the electromagnetically induced voltage across the primary winding 13 could be detected by the described voltmeter and comparator.

In operation, the transformer assembly is energized by the current source 19 which sends electrical current through the winding. In accordance with electromagnetic principles, a voltage is electromagnetically induced across the secondary winding 14. This voltage is measured by voltmeter 22 and interpreted as indicating whether the transformer is acceptable or unacceptable in accordance with predetermined specifications. Those transformers assemblies which indicate a voltage response less than the acceptable level are discarded. The reasons for the unacceptability of the transformers have been found to be caused by imperfect depositions of either the conductive, insulating or magnetic layers. Since the primary of the transformer is more complex than the single turn secondary almost all defects have been found to occur in the primary. Since the primary windings are thin and narrow only small currents may be passed through them without causing thermal destruction. Consequently, only a small magnetic flux will be induced around the secondary winding. Thus, a continuous magnetic loop is required to provide an easy flux path for the magnetic field, and to enable detection of the induced signal which would otherwise be lost amongst the ambient noise.

From the geometry of the continuous magnetic path the magnetic coupling coefficient between the primary and the secondary of the transformer can be determined. Thus, once the values of the exciting current and the induced voltage are measured, the mutual inductance can be calculated from which the permeability of the magnetic material can be determined. It is this permeability which is compared against a predetermined permeability in accordance with acceptance specifications.

The transformer assemblies that are interpreted as being acceptable are then severed by cutting on line 25 as illustrated in the drawing. This severing is along a plane perpendicular to the layers 12, 13 and 15. It has been found that the severing is best accomplished with an ultrasonic cutting device such as a cavitron although it is acceptable to use a carborundum or diamond saw. The severed secondary is then discarded and the primary portion of the transformer assembly comprises the magnetic head. The transducing gap 26 of the magnetic head assembly is included in the throat portion 27 between the magnetic layers 12 and 15. The magnetic layers are disposed closer together in the throat region than they are in the region over the windings.

Thereafter, the transducing gap is more accurately defined by lapping the severed surface to predetermined dimensions with a fine-grit diamond polish. Alternatively, another non-magnetic substrate having a magnetic head receiving recess therein may be bonded to the surface of the substrate 11 so as to enclose the magnetic head. The bonded substrate assembly which forms the slider is thereafter lapped in the region proximate to the magnetic head to define an air-bearing surface.

In practice thin-film magnetic heads are batch fabricated and in accordance with the teachings of this invention a plurality of thin-film transformers are simultaneously deposited on each wafer shaped substrate. Moreover, the deposition of successive thin-film layers is automated whereby vast quantities of magnetic heads are simultaneously produced. The testing of the magnetic properties of each transformer may also be automated. This invention provides an improved method for magnetically testing each magnetic head, while it is still a part of the common wafer and before dicing the substrate into individual magnetic heads.

While there has been described what are, at present, considered to be the preferred embodiments of manufacturing a thin-film head in accordance with the invention, it will be understood that various modifications may be made therein, and it is intended to cover in the appended claims all such modifications as followed in the true spirit and scope of the invention.

What is claimed is:

1. A method of fabricating a magnetic recording head comprising the steps of:

depositing a first magnetic layer;

depositing a primary conductive winding over a portion of said first magnetic layer;

depositing a secondary conductive winding spaced from said primary winding over a portion of said first magnetic layer;

depositing a second magnetic layer over adjacent portions of said primary and said secondary windings and against selected portions of said first magnetic layer, said first and second magnetic layers forming a continuous magnetic body, thus creating a transformer;

energizing one of said conductive windings with an electrical current;

measuring the electromagnetically-induced voltage across the other of said windings; and then severing said transformer between said first winding and said second winding.

2. The method set forth in claim 1 wherein said transformer is formed by thin-film depositions.

3. The method set forth in claim 1 wherein said severing step cuts said transformer in a plane perpendicular to the direction of the layers through said first and said second magnetic layers.

4. The method set forth in claim 1 wherein said first and second magnetic layers and said primary winding are substantially parallel to one another.

5. The method set forth in claim 1 and including the step of comparing said voltage with a predetermined level to determine whether said transformer has acceptable magnetic properties.

6. The method set forth in claim 1, wherein said second magnetic layer is spaced closer to said first magnetic layer in a region between said primary and said secondary windings than it is in the region over the windings.

7. The method set forth in claim 1 and further comprising the steps of depositing a first insulating layer on said first magnetic layer, and depositing a second insulating layer over said primary and said secondary windings so as to electrically isolate said windings from said first and said second magnetic layers.

8. The method set forth in claim 1 and further comprising the step of lapping said severed assembly to accurately define a transducing gap between said first and said second magnetic layers.

9. The method set forth in claim 1 wherein said first magnetic layer is deposited on a surface of a nonmagnetic substrate.

10. The method set forth in claim 9 and further including the step of dicing said nonmagnetic substrate around said transformer.

* * * * *